United States Patent [19]

Günesin

[11] 4,408,014
[45] Oct. 4, 1983

[54] METHOD FOR BLENDING PLASTIC AND RUBBER PHASE LATICES AND IMPROVING IMPACT PROPERTIES OF PLASTICS

[75] Inventor: Binnur Günesin, Warren, N.J.

[73] Assignee: The Firestone Tire & Rubber Company, Akron, Ohio

[21] Appl. No.: 376,530

[22] Filed: May 10, 1982

[51] Int. Cl.³ .................. C08L 9/10; C08L 33/24; C08L 25/08
[52] U.S. Cl. .................. 525/218; 525/194; 525/196; 525/197
[58] Field of Search .................. 525/197, 218

[56] References Cited

U.S. PATENT DOCUMENTS

| | | | |
|---|---|---|---|
| 2,910,451 | 10/1959 | Cantwell | 260/45.5 |
| 2,925,399 | 2/1960 | Schneider | 260/45.5 |
| 3,433,835 | 3/1969 | Müller et al. | 260/562 |
| 3,436,440 | 4/1969 | Abe et al. | 260/880 |
| 3,520,954 | 7/1970 | Blumel et al. | 260/894 |
| 3,689,596 | 9/1972 | Narayana | 260/876 B |
| 3,851,014 | 11/1974 | Dalton | 260/878 R |
| 3,879,495 | 4/1975 | Fujii et al. | 260/878 R |
| 4,112,022 | 9/1978 | Marien et al. | 260/881 |
| 4,363,897 | 12/1982 | Gunesin et al. | 525/195 |
| 4,366,291 | 12/1982 | Gunesin et al. | 525/218 |
| 4,373,068 | 2/1983 | Gunesin et al. | 525/218 |

*Primary Examiner*—Carman J. Seccuro
*Attorney, Agent, or Firm*—Daniel N. Hall

[57] ABSTRACT

The present invention provides a method for the modification of the impact strength of plastics by blending a plastic phase latex comprising a copolymer of an N-(alkoxymethyl)acrylamide monomer and at least one vinyl monomer with a rubber phase latex comprising a copolymer of a conjugated diene monomer, and an N-(alkoxymethyl)acrylamide monomer to form a mixture and, coagulating the mixture. A separate method is also provided for blending plastic and rubber phase latices which, in turn, modifies the impact properties of the plastics. It includes the steps of preparing a plastic phase latex comprising a first emulsion copolymer of a vinyl monomer selected from the group consisting of monovinyl aromatic compounds having from eight to about 20 carbon atoms and acrylic compounds having from three to about five carbon atoms and, an N-(alkoxymethyl)acrylamide monomer having the formula

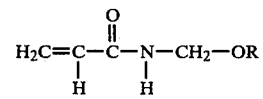

where R is selected from the group consisting of straight and branched alkyl chains having from one to about 20 carbon atoms; preparing a rubber phase latex comprising a second emulsion copolymer of a conjugated diene monomer having from about four to about 20 carbon atoms and the N-(alkoxymethyl)acrylamide monomer; blending the two latices and coagulating. A novel polymer having improved impact properties comprising a blend of the foregoing plastic and rubber latices is also provided for. The rubber phase latex disclosed herein can optionally contain one or more of the vinyl monomers.

24 Claims, No Drawings

METHOD FOR BLENDING PLASTIC AND RUBBER PHASE LATICES AND IMPROVING IMPACT PROPERTIES OF PLASTICS

TECHNICAL FIELD

The present invention is directed toward a method for modifying the impact strength of plastics. Another method provides for blending plastic and rubber phase latices utilizing emulsion polymerization techniques. A novel polymer comprising a blend of plastic and rubber latices and having improved impact strength is also provided.

The methods provide for the blending of separate plastic and rubber latices to produce high impact strength plastics which possess greater toughness than non-rubber modified plastics and which are reformable and remoldable. The methods also allow for the careful control of crosslinked density. Although blending of rubber and plastic via graft polymerization has produced comparable products, it has been found that the incorporation of certain N-(alkoxymethyl)acrylamide monomers in the separate plastic and rubber latices will provide the desired physical properties without grafting.

BACKGROUND ART

Commercially available high impact polystyrene (HIPS)-like plastics and acrylonitrile-butadiene-styrene (ABS)-like plastics are presently prepared via solution or emulsion techniques wherein polybutadiene rubber is dissolved in a solution of the plastic monomer(s) and graft polymerized onto the rubber. Alternatively, polybutadiene latex is prepared and crosslinked and subsequently, the plastic monomers are grafted onto the latex. From work such as this, it has been established that co-blending of rubber and plastic phases, without grafting or crosslinking does not give good impact strength. Nevertheless, grafting has not been a useful solution for modifying plastics inasmuch as the introduction of graft branches is not readily facilitated or controlled and it has remained difficult to introduce the optimum level of crosslinks by curing.

In order to eliminate the grafting step and also to allow the successful blending of rubber and plastic latices, certain amide containing monomers such as the N-(alkoxymethyl)acrylamides have been utilized in the present invention to form copolymers with both the rubber and plastic monomers. The copolymerization of various amide containing monomers with other monomers is known. One such U.S. Pat. No. 2,925,399, is directed toward a composition formed from a mixture comprising an elastomeric copolymer of butadiene and acrylonitrile with a thermoplastic copolymer of styrene and acrylonitrile. The patent also teaches that the elastomeric copolymers contain at least one further ethylenically unsaturated monomer such as acrylamide or the alkylether of methylol derivatives of acrylamide. Mixing the copolymers disclosed results in products having improved impact strength, although there is no suggestion that a separate monomer be added to both latices, prior to their combination.

U.S. Pat. No. 3,879,495 is directed toward high impact resistance plastics, obtained by polymerizing the plastic in the presence of a rubber. As the plastic segment, an ethylenically unsaturated monomer such as styrene, acrylonitrile, methylmethacrylate, vinyl chloride and N-ethoxymethylacrylamide is selected. Polymerization is conducted in the presence of an olefin-acrylate copolymer as the rubber modifier and, the patent states that the improved properties obtained are attributable to grafting and molecular dispersion.

Providing nitrile resins, stable toward thermal discoloration, is an object of U.S. Pat. No. 4,112,022. The nitrile resins disclosed comprise a copolymer of an $\alpha,\beta$-unsaturated nitrile with a vinyl monomer or, graft copolymers of an $\alpha,\beta$-unsaturated nitrile and a vinyl monomer copolymerizable with a diene rubber and blends of the two, which copolymer is coagulated with an inorganic metal salt. In order to stablize the resin, the addition of an acrylic acid compound is taught among which are disclosed N-(substituted alkyl)acrylamides.

Neither of the latter two patents suggests that the acrylamide containing monomer be copolymerized with the rubber and plastic monomers to form separate latices which can thereafter be blended together. While there are other known techniques for modifying the physical properties of high impact plastics, none are directed to the use of a substituted acrylamide particularly N-(alkoxymethyl)acrylamide, as shall be hereinafter described.

DISCLOSURE OF INVENTION

One method of the present invention provides for the modification of the impact strength of plastics. It includes the steps of blending a plastic phase latex comprising a copolymer of an N-(alkoxymethyl)acrylamide monomer and at least one vinyl monomer with a rubber phase latex comprising a second copolymer of the N-(alkoxymethyl)acrylamide monomer and a conjugated diene monomer to form a mixture and, coagulating the mixture.

A separate method is also provided for blending plastic and rubber phase latices which, in turn, modifies the impact properties of the plastics. It includes the steps of preparing a plastic phase latex comprising a first emulsion copolymer of a vinyl monomer selected from the group consisting of monovinyl aromatic compounds having from eight to about 20 carbon atoms and acrylic compounds having from three to about five carbon atoms and, an N-(alkoxymethyl)acrylamide monomer having the formula

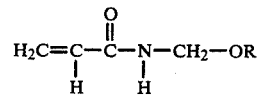

wherein R is selected from the group consisting of straight and branched alkyl chains having from one to about 20 carbon atoms; preparing a rubber phase latex comprising a second emulsion copolymer of a conjugated diene monomer having from about four to about 20 carbon atoms and the N-(alkoxymethyl)acrylamide monomer; blending from about 5 to 95 parts of the plastic phase latex with about 95 to 5 parts of the rubber phase latex to form a mixture and, coagulating the mixture. Coagulation, for either method, can be conducted with a compound selected from the group consisting of alcohols having from one to about three carbon atoms or aqueous metal salt solutions wherein the said metal can be di-, tri- or polyvalent.

The N-(alkoxymethyl)acrylamide monomer forms from about 0.2 to about 5.0 parts of the first emulsion copolymer, or plastic copolymer of the first method, and from about 0.2 to about 5.0 parts of the second emulsion copolymer, or rubber copolymer of the first method. The rubber phase latices can optionally contain one or more of the foregoing vinyl monomers.

Finally, a polymer blend having improved impact properties is disclosed which comprises a coagulated mixture of from about 95 to 5 parts of a plastic phase latex and from about 5 to 95 parts of a rubber phase latex. As set forth in the methods of the present invention, the plastic phase latex comprises a copolymer of an N-(alkoxymethyl)acrylamide monomer and at least one vinyl monomer and, the rubber phase latex comprises a copolymer of an N-(alkoxymethyl)acrylamide monomer and a conjugated diene monomer.

PREFERRED MODE FOR CARRYING OUT THE INVENTION

In order to obtain a toughened plastic according to the present invention, a rubber phase latex is employed to modify a plastic phase latex. Graft polymerization procedures are totally avoided by incorporating into each of the two latices, a substituted acrylamide monomer after which the latices are blended together. The functionality imparted to the resulting copolymer latices by the substituted acrylamide can be coordinated with a metal ion during a step of coagulating the latices or, it will undergo condensation during processing. In the latter instance, coagulation is first conducted with an alcohol to obtain the solid polymer. The coordination or condensation steps will improve the impact properties of the resulting polymers. Also, by varying the levels of substituted acrylamide monomers, it is possible to produce remoldable, reformable toughened plastics.

The substituted acrylamide monomers that are copolymerized with rubber and plastic monomers to form different latices are the substituted acrylamides having the formula

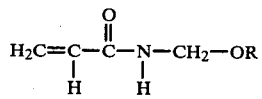

wherein R is a straight or branched alkyl chain having from one to about 20 carbon atoms with three to eight carbon atom chains being preferred. One particularly useful substituted acrylamide employed for the work reported herein is N-(isobutoxymethyl)acrylamide, hereinafter abbreviated IBMA, the R group being isobutyl.

With respect to the other monomers selected for the plastic and rubber phase latices, those that are polymerizable in emulsion systems can be employed. For the rubber latex, conjugated diene monomers having from about four to 20 carbon atoms can be employed with butadiene or isoprene being preferred. Additionally, halogenated or other substituted emulsion polymerizable monomers can be employed.

Copolymers of conjugated diene monomers with plastic forming monomers can also be employed as the rubber latex. One such synthetic rubber copolymer is styrenebutadiene rubber (SBR), formed by the polymerization of butadiene and styrene. Suitable plastic-forming monomers that can be employed have vinyl groups and include the monovinyl aromatic compounds having from eight to about 20 carbon atoms such as styrene, α-methylstyrene as well as other alkyl-substituted or halogen-substituted emulsion polymerizable monomers, and acrylic compounds having from three to about five carbon atoms, such as acrylonitrile and methyl methacrylate. A typical example of a rubber with one of the latter monomers would be nitrile rubber, the copolymer of butadiene and acrylonitrile. Mixtures of the foregoing plastic-forming monomers can also be present in the rubber.

As for the plastic latex, plastic-forming monomers containing vinyl groups are employed, as discussed hereinabove. Mixtures of the foregoing monomers can be employed for preparation of the plastic phase latex.

Preparation of the plastic and rubber copolymers is via emulsion polymerization with an emulsifier such as sodium lauryl sulfate. A water soluble initiator is employed such as diisopropylbenzene hydroperoxide and, a molecular weight modifier, n-dodecyl mercaptan, can be added. An activator such as tetraethylenepentamine is added to the reaction vessel immediately after the diene monomer is charged.

Other emulsifiers suitable for the present invention include long chain metal sulfonates, rosin acid and fatty acid salts. Amounts added range from about two parts per hundred of monomer (phm) to about five phm. Initiators suitable for the present invention other than diisopropylbenzene hydroperoxide include other free radical types such as peroxides and peroxydicarbonates, benzoyl peroxide, cumene hydroperoxide and tert-butyl peroxide, and the amount employed ranges from about 0.1 phm to about 0.6 phm depending upon the desired molecular weight of the polymer product. Similarly, the activators can include $FeSO_4.7H_2O$, alkyl amines having primary and secondary amines and sodium formaldehyde sulfoxylate in an amount of from about 0.1 phm to 0.6 phm. Other molecular weight modifiers suitable for this invention include tertiary alkyl mercaptans which are employed in amounts of from about 0.1 phm to about 0.3 phm. Antioxidants can also be employed such as di-tert-butyl-para-cresol (DBPC) and Santoflex which are added to the polymer latex in amounts of from about 0.1 to about 1.0 percent by weight of the solid polymer.

It is to be understood that the method of the present invention is not intended to be limited by the recitation of particular emulsifiers, initiators, activators or modifiers. All of these and others are well known to those skilled in the art of emulsion polymerization and, therefore, the method of the present invention encompasses and employs such techniques.

Synthesis of the plastic phase latex generally involves the steps of charging a reaction vessel with water, the detergent, a modifier if desired, the initiator, and the substituted acrylamide and vinyl monomers; polymerizing the monomers therein for a period of time of from about 4 to about 24 hours at a temperature of from about 0° C. to about 30° C. An emulsion copolymer is thus formed, which for purposes of discussion can be referred to as the plastic copolymer.

Synthesis of the rubber phase latex similarly involves the steps of charging a separate reaction vessel with water, the detergent, a modifier, if desired, the initiator and the substituted acrylamide and conjugated diene monomers; polymerizing the monomers for a period of time of from about 7 to about 12 hours at a temperature of from about 0° C. to about 10° C. A second emulsion copolymer is formed, referred to as the rubber copolymer.

After both latices are prepared, they are mixed together with constant stirring and then coagulated. The coagulum is subsequently washed with water and dried. Coagulation can be conducted by any of the known techniques for coagulation of a polymer latex with an electrolyte such as by mixing the latex and electrolyte together at a temperature above the freezing temperature and below the boiling temperature of the latex, the amount of electrolyte employed varying with several factors such as the solids content of the latex, the particle size of the latex, the amount of emulsifying agent in the latex, the particular electrolyte used, and so forth.

The latex and electrolyte are usually mixed by adding the latex to an aqueous solution of the electrolyte, adding the electrolyte, usually as a dilute aqueous solution, to the latex, or simultaneously feeding the latex and an aqueous solution of electrolyte to a mixing chamber. Temperatures of about 5° to 30° C. are preferred and agitation is normally continued throughout the coagulation. Among the electrolytes usually used for coagulation are alcohols or aqueous metal salt solutions. It is to be understood that a step of coagulation has been included only as a means of obtaining the useful solids from the latex. Insofar as coagulation is known, it is not to be considered as the point of novelty of the present invention.

Coagulation with alcohol or aqueous metal salt solutions will provide the solid polymer which is then washed and dried for subsequent usage such as compression or injection molding. While either system will coagulate the latex when metal salt solutions are selected, the latex blend also undergoes coordination which is believed to occur between the metal ions and the substituted acrylamides. Where alcohol is selected, coordination does not occur, however, upon heating, the polymer crosslinks through the substituted acrylamides. In either instance, the incorporation of the substituted acrylamides into the plastic and rubber phase latices provides the sites for crosslinking. The number of these sites and hence the properties of the polymer is readily controlled by this method of latex blending which has not been possible in existing systems.

Regarding composition of the plastic and rubber copolymers, the amount of the substituted acrylamide compound present in the plastic copolymer can range from about 0.2 to about 5.0 parts per hundred parts of said copolymer, with about 1.2 parts being preferred. The amount of vinyl compound or compounds present in the plastic copolymer ranges from about 95 to about 99.8 parts. This amount can be made up entirely of monovinyl aromatic compounds or a mixture of monovinyl aromatics with acrylic monomers. The total amount of acrylic monomers can range from about 0 to 25 parts with 20 to 25 parts being preferred. The balance of the composition will comprise the monovinyl aromatic monomers and substituted acrylamide. A preferred amount for the monovinyl aromatics is about 75 parts. Where two or more different vinyl compounds are present, the relative amounts of each can vary as desired, depending upon the desired properties of the copolymer, however, where acrylonitrile or α-methylstyrene are selected, a maximum amount is about 25 parts and the balance of the composition will comprise other monovinyl aromatics and the substituted acrylamide.

Similarly, the amount of substituted acrylamide compound present in the rubber copolymer can range from about 0.2 to about 5.0 parts per hundred parts of said copolymer, with about 1.2 parts being preferred. While up to about 5.0 parts of substituted acrylamide can be employed to provide high heat distortion molding resins, in order to maintain thermoplastic properties, the amount of IBMA should preferably not exceed more than about two parts. When more than two parts are present, the plastic becomes a thermoset.

The amount of diene compound present in the rubber copolymer ranges from about 75 to about 99.8 parts, with 75 parts being preferred. The amount of vinyl compound can comprise from 0 to 25 parts of a monovinyl aromatic compound disclosed hereinabove or from 0 to 25 parts of an acrylic compound as disclosed hereinabove. Given the foregoing amounts, either monomer or both can be totally excluded but if one or more is employed, the combined total should not exceed about 25 parts. Although greater amounts of vinyl compound can be present such as up to about 50 parts, where the plastic content of the rubber exceeds about 30 parts, processing becomes difficult inasmuch as the glass transition temperature of the rubber increases. For this reason the preferred maximum is about 25 parts in order to provide high heat distortion resins.

As stated hereinabove, other components can be present in the plastic and rubber copolymers, as are known to those skilled in the art. Their presence and respective amounts do not effect the practice of the present invention and are not a part thereof. Practice of the invention requires only that plastic and rubber copolymers be prepared containing substituted acrylamides and one or more of the other monomers disclosed herein.

With respect to blending of the two latices, a range of weight ratios is possible on the order of from about 95 to 5 parts plastic, with 85 to 75 parts preferred, to about 5 to 95 parts rubber, with 15 to 25 parts preferred. Generally, the composition of the copolymer latices is proportionate to the charge of monomers and the composition of the blend can be determined by controlling the monomer charges as well as the weight ratios of the resultant latices blended.

Finally, number average molecular weight of the copolymers of the present invention can range from about 100,000 to about 20,000. Preferred number average molecular weights of the plastic copolymer can range from about 100,000 to about 120,000 while for the rubber copolymer the range is from about 90,000 to about 120,000.

The metal ions that coagulate the polymer latices are all divalent, trivalent and polyvalent metal ions such as aluminum, barium, cadmium, calcium, chromium, cobalt, iron, magnesium, manganese, nickel, tin, zinc and the like which are supplied as metal salts having the formula $MX_n$ wherein M is one of the foregoing elements, X is an anion such as an organic carboxylate, halide, hydroxide, nitrate, sulfate, sulfonate and the like and n is from two to six. The amount of the metal salt employed is that amount which will provide at least one equivalent mole of the metal ion and two equivalent moles of IBMA bounded to the polymer latex in the final product. Coagulation with alcohol is facilitated by employing an alcohol having from one to three carbon atoms such as isopropanol in an amount which ranges from 800 to 1200 ml per 200 g of polymer.

In the experimental work set forth hereinbelow exemplifying the method of the present invention, as ABS-like plastic was synthesized and modified by a polybutadiene rubber latex. Next, a high impact strength polystyrene-like plastic was modified by a polybutadiene rubber latex. Impact properties determined for these products have been reported hereinbelow.

Syntheses of ABS-Like Plastics

For each synthesis of plastic and rubber latex, a 795 ml bottle was sealed with a rubber lined, three-hole crown cap and was purged with nitrogen for 15 minutes prior to charging and polymerization.

Plastic Latex I

Preparation of the plastic latices involved charging the bottle with 300.0 ml of water, 7.50 g of sodium lauryl sulfate, 0.9 g of diisopropylbenzene hydroperoxide, 0.1 to 0.3 g of n-dodecyl mercaptan, 0.75 g of tetraethylenepentamine, 90.0 g of styrene, 45.0 g of acrylonitrile and 3.0 to 9.0 g of N-(isobutoxymethyl)acrylamide. The polymerizations were conducted at 30° C. for 4 to 6 hours in the oxygen-free atmosphere. At the end of this time, 75 to 95 percent conversion of polymer latex was obtained from the bottle.

Rubber Latex I

Preparation of the rubber latices involved charging the bottle with 300.0 ml of water, 7.5 g of sodium lauryl sulfate, 0.9 g of diisopropylbenzene hydroperoxide, 0.3 g of n-dodecyl mercaptan, 0.75 g of tetraethylenepentamine, 14.0 g of butadiene and 3.0 to 8.0 g of N-(isobutoxymethyl)acrylamide. Polymerizations were conducted at 5° C. for 7 to 12 hours in the oxygen-free atmosphere. A 55 to 75 percent conversion resulted.

The two basic latices, having several different compositions, were mixed together with stirring and then coagulated into isopropanol or various metal salt solutions. The coagulum was washed with hot water several times and dried under vacuum at 50° C. for 48 hours. Each of the copolymers were characterized prior to blending for their exact composition using NMR elemental analysis. After the samples were totally dry, impact test samples were prepared on compression molded samples to ASTM D-256 methods. Samples were notched one-eighth inch (3.19 mm) for notched Izod tests (test method A). Readings were recorded in ft lb/in units (J/m). Hardness tests were conducted according to ASTM D-785. Results have been set forth in Table I. Abbreviations appearing in Table I are: Bd (butadiene), St (styrene) and Acn (acrylonitrile).

about two to 4.5 weight percent and both metal salts and isopropanol were employed for coagulation. The other four examples were tested and reported for purposes of comparison with the present invention.

More specifically, Examples 1 and 2 were prepared according to the method of the invention and show a significant improvement in impact values over Examples 3 and 4 where IBMA was not incorporated into the plastic latex. And even greater difference is observed in Example 5 where no IBMA was present in either the rubber or the plastic latex. Examples 6 to 9 present blends with only about two weigh percent of IBMA and it is to be noted that maximum impact strength was obtained when coagulation was conducted with alcohol. At about four weight percent, however, the metal salt gave better impact strength, as reported in Example 2. For Examples 10 to 12, the content of IBMA in the blend exceeded four weight percent with good results, the highest being Example 12, coagulated in alcohol. For comparative purposes, Example 13 is a commercial ABS having high impact strength. It is readily apparent that several of the other examples had comparable impact strengths while many exceeded the value of Example 13.

Thus, it can be seen that by varying the level of IBMA in the blend, ABS-like plastics can be prepared having different impact values. The advantage of lower levels of IBMA incorporation is that the resulting blends are reformable and remoldable. Where higher levels of IBMA are employed, the blends are not reformable which can be attributed to thermosetting of IBMA at temperatures of about 150° C.

Syntheses of HIPS-Like Plastics

For each synthesis of plastic and rubber latices, a 795 ml bottle was sealed with a rubber lined, three-hole crown cap and was purged with nitrogen for 15 minutes.

Plastic Latex II

Preparation of a first plastic latex involved charging the bottle with 300.0 ml of water, 7.5 g of sodium lauryl sulfate, 0.9 g of diisopropylbenzene hydroperoxide, 0.3 g of n-dodecyl mercaptan, 0.75 g of tetraethylenepentamine, 100.0 to 150.0 g of styrene and 6.0 to 12.0 g of N-(isobutoxymethyl)acrylamide. The polymerizations were conducted at 30° C. for 5 hours again, in an oxy-

TABLE I

| Ex. No. | Rubber Phase Latex | Plastic Phase Latex | Calculated IBMA wt % in blend | Calculated Bd wt % in blend | Impact Strength J/m | Hardness Rockwell R | Coagulation Technique |
|---|---|---|---|---|---|---|---|
| 1 | Bd/IBMA | St/Acn/IBMA | ~3.7 | ~24.0 | 304.4 | 94 | isopropanol |
| 2 | Bd/IBMA | St/Acn/IBMA | 3.7 | ~24.0 | 453.9 | 84 | $ZnCl_2$ |
| 3 | Bd/IBMA | St/Acn | 0.7 | ~24.0 | 164.5 | 99 | isopropanol |
| 4 | Bd/IBMA | St/Acn | 0.7 | ~24.0 | 106.8 | 88 | $ZnCl_2$ |
| 5 | Bd | St/Acn | — | 23.4 | 94.0 | 99 | isopropanol |
| 6 | Bd/IBMA | St/Acn/IBMA | <2.0 | ~23.0 | 299.0 | 89 | isopropanol |
| 7 | Bd/IBMA | St/Acn/IBMA | <2.0 | 25.0 | 395.2 | 92 | isopropanol |
| 8 | Bd/IBMA | St/Acn/IBMA | <2.0 | 23.0 | 176.2 | 88 | $ZnCl_2$ |
| 9 | Bd/IBMA | St/Acn/IBMA | <2.0 | 25.0 | 88.6 | 89 | $ZnCl_2$ |
| 10 | Bd/IBMA | St/Acn/IBMA | ~4.5 | 27.5 | 245.6 | 114 | $Co(NO_3)_2$ |
| 11 | Bd/IBMA | St/Acn/IBMA | ~4.5 | 27.5 | 257.9 | 119 | $Cr_2(SO_4)_3$ |
| 12 | Bd/IBMA | St/Acn/IBMA | ~4.5 | 25.0 | 350.3 | 105 | isopropanol |
| 13[a] | Bd | St/Acn | | 22.0 | 288.4 | 104 | — |

[a]Commercial ABS with high impact strength property from Borg-Warner

In nine of the examples reported in Table I, IBMA was present in both plastic and rubber latices. The amount of IBMA in the blend ranged generally from gen-free atmosphere. At the end of this time, a 100 percent conversion of polymer latex was obtained.

Plastic Latex III

Preparation of a second plastic latex involved charging the bottle with 300.0 ml of water, 7.5 g of sodium lauryl sulfate, 0.9 g of diisopropylbenzene hydroperoxide, 0.3 g of n-dodecyl mercaptan, 0.75 g of tetraethylenepentamine, 90.0 to 110.0 g of styrene, 70.0 to 50.0 g of α-methylstyrene (α-Me-Sty) and 5.0 to 12.0 g of N-(isobutoxymethyl)acrylamide. The polymerizations were conducted at 30° C. for 16 hours in the oxygen-free atmosphere. At the end of this time, a 75 percent conversion of polymer latex was obtained.

After preparation of plastic latices II and III, each was mixed with the rubber latex I discussed hereinabove at different weight ratios. Coagulation was again into alcohol or aqueous metal salt solutions. The blends were thereafter washed with hot water and dried under vacuum for 48 hours at 50° C. Testing of injection molded samples was performed as described hereinabove and has been reported in Table II.

TABLE II

| | Impact Properties of HIPS-like Plastics | | | | | |
|---|---|---|---|---|---|---|
| Ex. No. | IBMA wt % in blend | α-MeSty wt % in terpolymer | Bd wt % in blend | Impact Strength J/m | Hardness Rockwell R | Coagulation Technique |
| 14 | 2.2 | 44.0 | 23.0 | 112.1 | 92 | isopropanol |
| 15 | 2.0 | 45.0 | 23.0 | 138.8 | 97 | isopropanol |
| 16 | 0.64 | 40.9 | 21.4 | 96.1 | 102 | isopropanol |
| 17 | 0.8 | 52.0 | 22.0 | 101.5 | 98 | isopropanol |
| 18 | 1.8 | 44.0 | 20.0 | 128.2 | 96 | isopropanol |
| 19 | 1.1 | 47.0 | 22.6 | 117.5 | 94 | isopropanol |
| 20[b] | — | — | — | 122.8 | 101 | isopropanol |
| 21[c] | — | — | — | 144.2 | 98 | isopropanol |

[b]Shell DP-335
[c]Shell DP-338

With the exception of Examples 16 and 17, containing less than only 1.0 weight percent IBMA, all of the alcohol coagulated blends exhibited good impact strength. Examples 21 and 22 are not part of the present invention but are instead commercially available high impact and super high impact polystyrenes, respectively, both comprising styrene-butadiene-styrene linear block copolymers and polystyrene. By comparing their impact strength values with those of the better IBMA blend plastics, it can be seen that good impact values can be obtained according to the present invention.

Based upon the results presented in Tables I and II, it should be apparent that the impact strength of a plastic modified with a rubber can be significantly improved by polymerizing an N-(alkoxymethyl)acrylamide such as IBMA separately with a rubber and plastic latex and then blending the two together. It is to be understood that the various examples reported in the tables have been provided to present results obtainable by practice of the disclosed invention. Inasmuch as various monomers that can be employed to practice the process of the present invention have been disclosed, the invention is not to be limited by the examples provided herein. It will be understood, therefore, that other monomers can be substituted for those that have been exemplified as is true for the coagulants. Regarding the selection of emulsifiers, initiators, activators, modifiers and the like, the present invention should not be restricted to less than the total group of such compounds which are known for the preparation of emulsion polymers.

Thus, it can be seen that the disclosed invention carries out the objects of the invention set forth hereinabove. As will be apparent to those skilled in the art, blending of plastic and rubber phase latices is possible according to the method of the present invention which calls for the presence of one of the N-(alkoxymethyl)acrylamide monomers disclosed herein in each of the separate latices. The result of the blending provides improved impact properties for the plastic. It is also to be understood that the amounts of particular monomers to be employed can be made without departing from the spirit of the invention herein disclosed and described, and that the scope of the invention shall include all modifications and variations that fall within the scope of the attached claims.

I claim:

1. A method for modifying the impact strength of plastics comprising the steps of:

blending a plastic phase latex comprising a copolymer of an N-(alkoxymethyl)acrylamide monomer and at least one vinyl monomer selected from the group consisting of monovinyl aromatic compounds and acrylic compounds with a rubber phase latex comprising a second copolymer of said N-(alkoxymethyl)acrylamide monomer and a conjugated diene monomer to form a mixture; and coagulating said mixture.

2. A method, as set forth in claim 1, wherein the composition of said mixture comprises:

from about 95 to 5 parts of said plastic phase latex and from about 5 to 95 parts of said rubber latex.

3. A method, as set forth in claim 1, wherein said N-(alkoxymethyl)acrylamide monomer has the formula

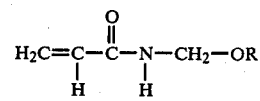

where R is selected from the group consisting of straight and branched alkyl chains having from one to about 20 carbon atoms.

4. A method, as set forth in claim 3, wherein the composition of said plastic phase latex comprises:

from about 75 to 99.8 parts of said monovinyl aromatic compound;

from about 0 to 25 parts of said acrylic compound; and from about 0.2 to 5.0 parts of said N-(alkoxymethyl)acrylamide; and wherein the composition of said rubber phase latex comprises:

from about 99.8 to 95 parts of said conjugated diene; and from about 0.2 to 5.0 parts of said N-(alkoxymethyl)acrylamide.

5. A method, as set forth in claim 4, wherein said rubber phase latex can comprise additionally:
up to about 25 parts of at least one of said vinyl monomers with the proviso that the amount of said conjugated diene be reduced an equivalent amount.

6. A method, as set forth in claim 4, wherein said plastic phase latex is prepared at a temperature range of from about 0° to 30° C. and for a time of about 4 hours to 24 hours and said rubber phase latex is prepared at a temperature range from about 0° to 10° C. and for a time of about 7 hours to 16 hours.

7. A method, as set forth in claim 6, wherein said steps of preparing said plastic phase latex and said rubber phase latex includes the steps of:
charging separate reaction vessels with water, an emulsifier, an initiator, the desired monomer compounds and an activator; and
polymerizing the desired monomers to form said first and second emulsion copolymers.

8. A method, as set forth in claim 7, wherein said emulifier is sodium lauryl sulfate; said initiator is diisopropylbenzene hydroperoxide and said activator is tetraethylenepentamine.

9. A method, as set forth in claim 4, wherein said monovinyl aromatic compound is styrene; said acrylic compound is acrylonitrile; said N-(alkoxymethyl)acrylamide is N-(isobutoxymethyl)acrylamide and said conjugated diene is butadiene.

10. A method, as set forth in claim 1, wherein said step of coagulating said mixture is conducted with a compound selected from the group consisting of alcohols having from one to about three carbon atoms and aqueous metal salt solutions wherein said metal can be di-, tri- or polyvalent.

11. A method for blending plastic and rubber phase latices, to modify the impact properties of the plastic, comprising the steps of:
preparing a plastic phase latex comprising a first emulsion copolymer of a vinyl monomer selected from the group consisting of monovinyl aromatic compounds having from eight to about 20 carbon atoms and an acrylic compound having from three to about five carbon atoms; and an N-(alkoxymethyl)acrylamide monomer having the formula

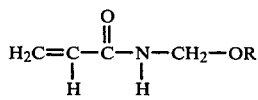

where R is selected from the group consisting of straight and branched alkyl chains having from one to about 20 carbon atoms;
preparing a rubber phase latex comprising a second emulsion copolymer of a conjugated diene monomer having from about four to about 20 carbon atoms and said N-(alkoxymethyl)acrylamide monomer;
blending from about 95 to 5 parts of said plastic phase latex with from about 5 to 95 parts of said rubber phase latex to form a mixture; and
coagulating said mixture.

12. A method, as set forth in claim 11, wherein said steps of preparing said plastic phase latex and said rubber phase latex includes the steps of:
charging separate reaction vessels with water, an emulsifier, an initiator, the desired monomer compounds and an activator; and
polymerizing the desired monomers to form said first and second emulsion copolymers.

13. A method, as set forth in claim 12, wherein said first emulsion copolymer is prepared at a temperature range of from about 0° to 30° C. and for a time of about 4 hours to 24 hours and said second emulsion copolymer is prepared at a temperature range from about 0° to 10° C. and for a time of about 7 hours to 16 hours.

14. A method, as set forth in claim 11, wherein the composition of said first emulsion copolymer comprises:
from about 75 to 99.8 parts of said monovinyl aromatic compound;
from about 0 to 25 parts of said acrylic compound; and
from about 0.2 to 5.0 parts of said N-(alkoxymethyl)acrylamide; and wherein the composition of said second emulsion copolymer comprises:
from about 99.8 to 95 parts of said conjugated diene; and
from about 0.2 to 5.0 parts of said N-(alkoxymethyl)acrylamide.

15. A method, as set forth in claim 14, wherein said second emulsion copolymer can comprise additionally:
up to about 25 parts of at least one of said vinyl monomers with the proviso that the amount of said conjugated diene be reduced an equivalent amount.

16. A method, as set forth in claim 14, wherein the composition of said mixture comprises:
from about 85 to 75 parts of said plastic phase latex and from about 15 to 25 parts of said rubber phase latex.

17. A method, as set forth in claim 16, wherein said monovinyl aromatic compound is styrene; said acrylic compound is acrylonitrile; said N-(alkoxymethyl)acrylamide is N-(isobutoxymethyl)acrylamide and said conjugated diene is butadiene.

18. A method, as set forth in claim 12, wherein said emulsifier is sodium lauryl sulfate; and initiator is diisopropylbenzene hydroperoxide and said activator is tetraethylenepentamine.

19. A method, as set forth in claim 11, wherein said step of coagulating said mixture is conducted with a compound selected from the group consisting of alcohols having from one to about three carbon atoms and aqueous metal salt solutions wherein said metal can be di-, tri- or polyvalent.

20. A polymer blend having improved impact properties comprising:
a coagulated mixture of from about 95 to 5 parts of a plastic phase latex and from about 5 to 95 parts of a rubber phase latex;
said plastic phase latex comprising:
a copolymer of an N-(alkoxymethyl)acrylamide monomer and at least one vinyl monomer selected from the group consisting of monovinyl aromatic compounds and acrylic compounds and said rubber phase latex comprising:
a copolymer of an N-(alkoxymethyl)acrylamide monomer and a conjugated diene monomer.

21. A polymer blend, as set forth in claim 20, wherein said N-(alkoxymethyl)acrylamide monomer has the formula

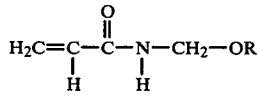

where R is selected from the group consisting of straight and branched alkyl chains having from one to about 20 carbon atoms;

said vinyl monomer is selected from the group consisting of monovinyl aromatic compounds having from eight to about 20 carbon atoms and an acrylic compound having from three to about five carbon atoms; and said conjugated diene monomer having from about four to about 20 carbon atoms.

22. A polymer blend, as set forth in claim 21, wherein the composition of said plastic phase latex comprises:

from about 75 to 99.8 parts of said monovinyl aromatic compound;

from about 0 to 25 parts of said acrylic compound; and from about 0.2 to 5.0 parts of said N-(alkoxymethyl)acrylamide; and wherein the composition of said rubber phase latex comprises:

from about 99.8 to 95 parts of said conjugated diene; and from about 0.2 to 5.0 parts of said N-(alkoxymethyl)acrylamide.

23. A polymer blend, as set forth in claim 22, wherein the composition of said blend comprises:

85 to 75 parts of said plastic phase latex and 15 to 25 parts of said rubber phase latex.

24. A polymer blend, as set forth in claim 22, wherein said monovinyl aromatic compound is styrene; said acrylic compound is acrylonitrile; said N-(alkoxymethyl)acrylamide is N-(isobutoxymethyl)acrylamide and said conjugated diene is butadiene.

* * * * *